(12) United States Patent
Fukushima

(10) Patent No.: US 8,236,193 B2
(45) Date of Patent: *Aug. 7, 2012

(54) WORKING MEDIUM FOR HEAT CYCLE

(75) Inventor: Masato Fukushima, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 101 days.

This patent is subject to a terminal disclaimer.

(21) Appl. No.: 12/540,511

(22) Filed: Aug. 13, 2009

(65) Prior Publication Data

US 2009/0301090 A1  Dec. 10, 2009

Related U.S. Application Data

(63) Continuation of application No. PCT/JP2008/053301, filed on Feb. 26, 2008.

(30) Foreign Application Priority Data

Feb. 26, 2007  (JP) ................... 2007-044959

(51) Int. Cl.
C09K 5/04 (2006.01)
F01K 25/10 (2006.01)
F01K 25/08 (2006.01)
(52) U.S. Cl. ............... 252/67; 60/670; 60/671; 570/134
(58) Field of Classification Search .................... 252/67; 60/670, 671; 570/134
See application file for complete search history.

(56) References Cited

U.S. PATENT DOCUMENTS

| 2,490,764 A | * | 12/1949 | Benning et al. | ............... 570/134 |
| 6,299,792 B1 | * | 10/2001 | Feiring et al. | ................... 252/68 |
| 6,852,684 B1 | * | 2/2005 | Westbrook et al. | ........... 510/410 |
| 2008/0161221 A1 | * | 7/2008 | Okamoto et al. | ............. 510/411 |
| 2009/0020267 A1 | | 1/2009 | Fukushima | |

FOREIGN PATENT DOCUMENTS

| JP | 02240186 A | * | 9/1990 |
| JP | 02-272086 | | 11/1990 |
| JP | 05-239450 | | 9/1993 |
| JP | 07-223981 | | 8/1995 |
| JP | 07-258124 | | 10/1995 |
| JP | 2001-509180 | | 7/2001 |
| JP | 2003-221596 | | 8/2003 |
| JP | 3580811 | | 7/2004 |
| JP | 2004-346118 | | 12/2004 |
| JP | 2006-335825 | | 12/2006 |
| JP | 2007-077361 | | 3/2007 |
| JP | 2007-162986 | | 6/2007 |
| WO | 2005-007771 | | 1/2005 |
| WO | 2005-008819 | | 1/2005 |
| WO | WO 2007032211 A1 | * | 3/2007 |
| WO | 2007-114497 | | 10/2007 |

OTHER PUBLICATIONS

CAS reg. No. 80793-17-5, Nov. 16, 1984.*
Definition for "Rankine cycle", Concise Science Dictionary, Oxford University Press, 1984, p. 588.*
Y. Hisazumi et al., "Proposal for a high efficiency LNG power-generation system utilizing waste heat from the combined cycle[1]", Applied Energy 60 (1998) 169-182.
V. Maizza et al., "Unconventional working fluids in organic Rankine-cycles for waste energy recovery systems", Applied Thermal Engineering 21 (2001) 381-390.

* cited by examiner

*Primary Examiner* — Douglas M C Ginty
(74) *Attorney, Agent, or Firm* — Oblon, Spivak, McClelland, Maier & Neustadt, L.L.P.

(57) ABSTRACT

A working medium for heat cycle has less impact on the environment and is excellent in heat cycle characteristics for a Rankine cycle system, a heat pump cycle system, and a refrigerating cycle system. The working medium has the formula $C_nF_{2n+1}$—$C_mH_{2m+1}$, wherein n is an integer of from 2 to 8, an m is an integer of from 0 to 3.

12 Claims, 5 Drawing Sheets

WORKING MEDIUM FOR HEAT CYCLE

CROSS-REFERENCE TO RELATED APPLICATIONS

This application is a continuation of PCT/JP08/053,301 filed Feb. 26, 2008 and claims the benefit of JP 2007-044959 filed Feb. 26, 2007.

TECHNICAL FIELD

The present invention relates to a working medium for heat cycle, and a Rankine cycle system, a heat pump cycle system and a refrigerating cycle system, employing such a working medium.

BACKGROUND ART

A technology to recover an energy from a heat source for a medium-to-low temperature range lower than the temperature obtainable by burning a fuel such as heavy oil or petroleum, has been advanced, and power generation by ocean thermal energy conversion, geothermal binary power generation, waste heat recovery power generation, solar thermal power generation, heating by a heat pump, heat exchange by a heat pipe, etc. have been practically used or tested.

As a working medium to be used for such power generation, heat pump, etc., water, a hydrocarbon such as propane or butane, a fluorocarbon such as trichlorofluoromethane (CFC-11), dichlorodifluoromethane (CFC-12), chlorodifluoromethane (HCFC-22), trichlorotrifluoroethane (CFC-113) or dichlorotetrafluoroethane (CFC-114), or ammonia, has, for example, been known (Patent Documents 1 and 2).

Ammonia and hydrocarbons have some restrictions in their commercial use in view of safety problems such as toxicity, inflammability and corrosiveness or for such a reason that they are poor in the energy efficiency.

Many of fluorocarbons have attracted attention as prospective working media in view of their merits such as no substantial toxicity, non-inflammability, chemical stability, availability of various fluorocarbons having different standard boiling points, and evaluation and researches of fluorocarbons have been actively carried out.

However, among fluorocarbons, compounds having chlorine atoms have persistence in environment and are considered to be related to ozone depletion, and they are stepwisely being abolished. For example, chlorofluorocarbons (CFC) containing chlorine atoms and having all hydrogen atoms halogenated, have already been abolished completely in advanced countries such as Japan, U.S.A. and Europe. Further, with respect to hydrochlorofluorocarbons (HCFC) containing hydrogen atoms, their reduction towards total abolition by 2020 is being carried out in advanced countries. Further, perfluorocarbons (PFC) and hydrofluorocarbons (HFC) contain no chlorine atoms and are not influential over the ozone layer, but their influence over global warming has been pointed out, and they are regarded as compounds for global warming, emission of which to the atmosphere must be controlled.

Patent Document 1: Japanese Patent No. 3,580,811
Patent Document 2: JP-A-2006-335825

DISCLOSURE OF THE INVENTION

Object to be Accomplished by the Invention

It is an object of the present invention to provide a working medium for heat cycle, which is nonflammable, less influential over the environment and excellent in heat cycle characteristics and to provide a Rankine cycle system, a heat pump cycle system and a refrigerating cycle system, employing such a working medium and having high capacity and efficiency.

Means to Accomplish the Object

The working medium for heat cycle of the present invention is characterized in that it comprises a compound represented by the following formula (1):

$$C_nF_{2n+1}-C_mH_{2m+1} \qquad (1)$$

wherein n is an integer of from 2 to 8, and m is an integer of from 0 to 3.

The compound represented by the formula (1) is preferably a compound represented by the following formula (1-1), a compound represented by the following formula (1-2), or a compound represented by the following formula (1-3):

$$C_4F_9-C_2H_5 \qquad (1-1)$$

$$C_6F_{13}-H \qquad (1-2)$$

$$C_6F_{13}-C_2H_5 \qquad (1-3).$$

The Rankine cycle system of the present invention is characterized in that it is a system employing the working medium for heat cycle of the present invention.

The heat pump cycle system of the present invention is characterized in that it is a system employing the working medium for heat cycle of the present invention.

The refrigerating cycle system of the present invention is characterized in that it is a system employing the working medium for heat cycle of the present invention.

Effects of the Invention

The working medium for heat cycle of the present invention is nonflammable, less influential over the environment and excellent in heat cycle characteristics.

The Rankine cycle system of the present invention has high power generation capacity and Rankine cycle efficiency.

The heat pump cycle system of the present invention has high heat pump capacity and heat pump cycle efficiency.

The refrigerating cycle system of the present invention has high refrigerating capacity and refrigerating cycle efficiency.

MEANING OF SYMBOLS

Figure 1:
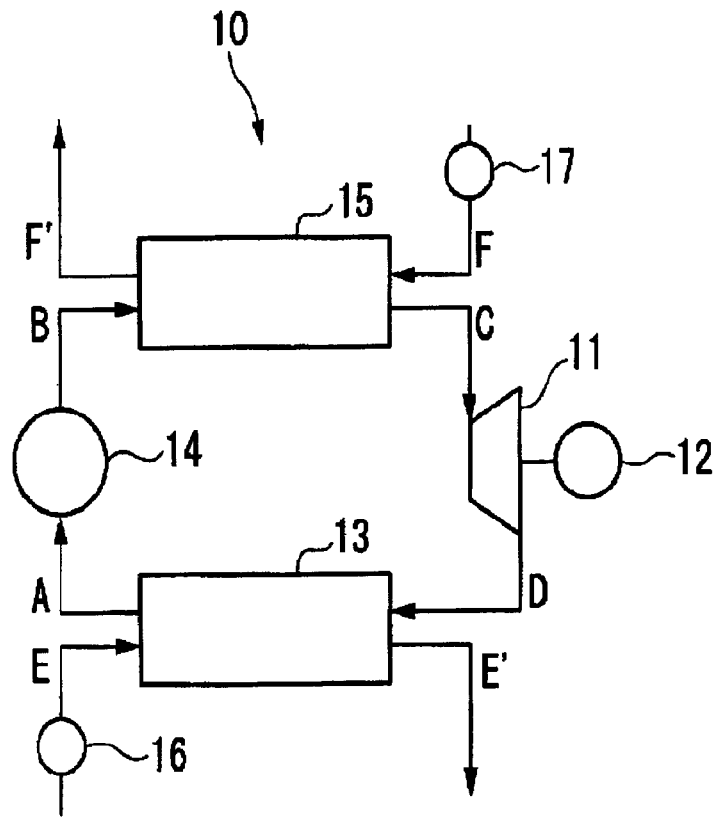
FIG. 1 is a schematic construction view showing an example of the Rankine cycle system of the present invention.

10: Rankine cycle system
20: Heat pump cycle system

BEST MODE FOR CARRYING OUT THE INVENTION

In this specification, a compound represented by the formula (1) will be referred to as compound (1). The same applies to compounds represented by other formulae.
Working Medium The working medium for heat cycle of the present invention is a working medium comprising compound (1):

$$C_nF_{2n+1}\text{—}C_mH_{2m+1} \quad (1)$$

wherein n is an integer of from 2 to 8, and m is an integer of from 0 to 3.

Compound (1) is nonflammable, has high stability, is excellent in compatibility with usual materials and less influential over the environment as compared with other HFC, and is excellent in heat cycle characteristics.

Compound (1) may be linear or branched.

If the numerical value of n+m is large, the standard boiling point and the critical temperature tend to be very high, whereby when such a compound is applied as a working medium for heat cycle, the size or the performance of the instrument tends to substantially deteriorate, such being undesirable. The value of m presents a substantial influence over the flammability of the compound. From the viewpoint of safety, the compound is preferably non-flammable, and the value of m is preferably a value smaller than n.

From these points of view, n is preferably an integer of from 4 to 6, and m is preferably 0 or 2.

Compound (1) is preferably at least one member selected from the group consisting of the following compounds (1-1), (1-2) and (1-3) from the viewpoint of the standard boiling point, critical temperature, stability, non-flammability, etc.

$$C_4F_9\text{—}C_2H_5 \quad (1\text{-}1)$$

$$C_6F_{13}\text{—}H \quad (1\text{-}2)$$

$$C_6F_{13}\text{—}C_2H_5 \quad (1\text{-}3)$$

The working medium for heat cycle of the present invention may contain $C_{1-4}$ alcohols or compounds used as conventional working media, cooling media or heat-conducting media (such alcohols and compounds will hereinafter generally referred to as other compounds).

As such other compounds, the following compounds may be mentioned.

$C_{1-4}$ alcohols: Methanol, ethanol, 1-propanol, 1-butanol, 2-methyl, 2-propanol, etc.

Chlorocarbons: Methylene chloride, trichloroethylene, etc.

Hydrochlorofluorocarbons (HCFC): 1,1-Dichloro-2,2,2-trifluoroethane, 1,1-dichloro-1-fluoroethane, 3,3-dichloro-1,1,1,2,2-pentafluoropropane, 3,3-dichloro-1,1,2,2,3-pentafluoropropane, etc.

Hydrofluorocarbons (HFC): Difluoromethane, 1,1,1,2-tetrafluoroethane, 1,1,1-trifluoroethane, 1,1-difluoroethane, 1,1,1,2,3,3,3-heptafluoropropane, 1,1,1,3,3,3-hexafluoropropane, 1,1,1,3,3-pentafluoropropane, 1,1,2,2,3-pentafluoropropane, 1,1,1,3,3-pentafluorobutane, 1,1,1,2,2,3,4,5,5,5-decafluoropentane, 1,1,2,2,3,3,4-heptafluorocyclopentane, etc.

Fluoroethers: Perfluoropropyl methyl ether ($C_3F_7OCH_3$), perfluorobutyl methyl ether ($C_4F_9OCH_3$), perfluorobutyl ethyl ether ($C_4F_9OC_2H_5$), 1,1,2,2-tetrafluoroethyl-2,2,2-trifluoroethyl ether ($CHF_2CF_2OCH_2CF_3$), etc.

The content of such other compounds may be within a range not to substantially lower the effects of the present invention, and it is usually at most 30 mass %, preferably at most 20 mass %, particularly preferably at most 15 mass %, in the working medium (100 mass %). On the other hand, when other compounds are contained, their amount is usually preferably at least 1 mass %.

The working medium of the present invention has sufficiently high stability against heat and oxidation. However, in order to further improve the stability against heat and oxidation, a stabilizer such as an oxidation resistance-improving agent, a heat resistance-improving agent or a metal deactivator may be incorporated.

The oxidation resistance-improving agent and/or the heat resistance-improving agent may, for example, be N,N'-diphenylphenylenediamine, p-octyldiphenylamine, p,p'-dioctyldiphenylamine, N-phenyl-1-naphthylamine, N-phenyl-2-naphthylamine, N-(p-dodecyl)phenyl-2-naphthylamine, di-1-naphthylamine, di-2-naphthylamine, N-alkylphenothiazine, 6-(t-butyl)phenol, 2,6-di-(t-butyl)phenol, 4-methyl-2,6-di-(t-butyl)phenol or 4,4'-methylenebis(2,6-di-t-butylphenol). They may be used alone or in combination as a mixture of two or more of them.

The metal deactivator may, for example, be imidazole, benzimidazole, 2-mercaptobenzothiazole, 2,5-dimercaptothiadiazole, salicylysine-propylenediamine, pyrazole, benzotriazole, tritriazole, 2-methylbenzamidazole, 3,5-dimethylpyrazole, methylenebis-benzotriazole, an organic acid or an ester thereof, a primary, secondary or tertiary aliphatic amine, an amine salt of an organic acid or inorganic acid, a heterocyclic nitrogen-containing compound, an amine salt of an alkyl phosphate, or a derivative thereof.

The content of such a stabilizer is usually at most 5 mass %, preferably at most 1 mass %, in the working medium (100 mass %). On the other hand, when a stabilizer is incorporated, its amount is usually preferably at least 0.001 mass %.
Ranking Cycle System The Rankine cycle system is a system wherein in an evaporator, a working medium is heated by e.g. geothermal energy, solar heat or waste heat in a medium-to-high temperature range at a level of from 50 to 200° C., and the vaporized working medium in a high temperature and high pressure state is adiabatically expanded by an expansion device, so that a power generator is driven by the work generated by the adiabatic expansion to carry out power generation.

FIG. 1 is a schematic construction view illustrating an example of the Rankine cycle system of the present invention. The Rankine cycle system 10 is a system generally comprising an expansion device 11 to let a high temperature/high pressure working medium vapor C expand to form a low temperature/low pressure working medium vapor D, a power generator 12 to be driven by the work generated by the adiabatic expansion of the working medium vapor C in the expansion device 11, a condenser 13 to cool the working medium vapor D discharged from the expansion device 11 to liquefy it to form a working medium A, a pump 14 to pressurize the working medium A discharged from the condenser 13 to form a high pressure working medium B, an evaporator 15 to heat the working medium B discharged from the pump 14 to form a high temperature/high pressure working medium vapor C, a pump 16 to supply a fluid E to the condenser 13 and a pump 17 to supply a fluid F to the evaporator 15.

In the Rankine cycle system 10, the following cycle is repeated.

(i) A high temperature/high pressure working medium vapor C discharged from an evaporator 15 is expanded by an expansion device 11 to form a low temperature/low pressure working medium vapor D. At that time, a power generator 12 is driven by the work generated by the adiabatic expansion of the working medium vapor C in the expansion device 11, to carry out power generation.

(ii) The working medium vapor D discharged from the expansion device 11 is cooled by a fluid E in a condenser 13 and liquefied to form a working medium A. At that time, the fluid E is heated and becomes a fluid E', which is discharged from the condenser 13.

(iii) The working medium A discharged from the condenser 13 is pressurized by a pump 14 to form a high pressure working medium B.

(iv) The working medium B discharged from the pump 14 is heated by a fluid F in the evaporator 15 to form a high temperature/high pressure working medium vapor C. At that time, the fluid F is cooled to form a fluid F', which is then discharged from the evaporator 15.

Figure 2:
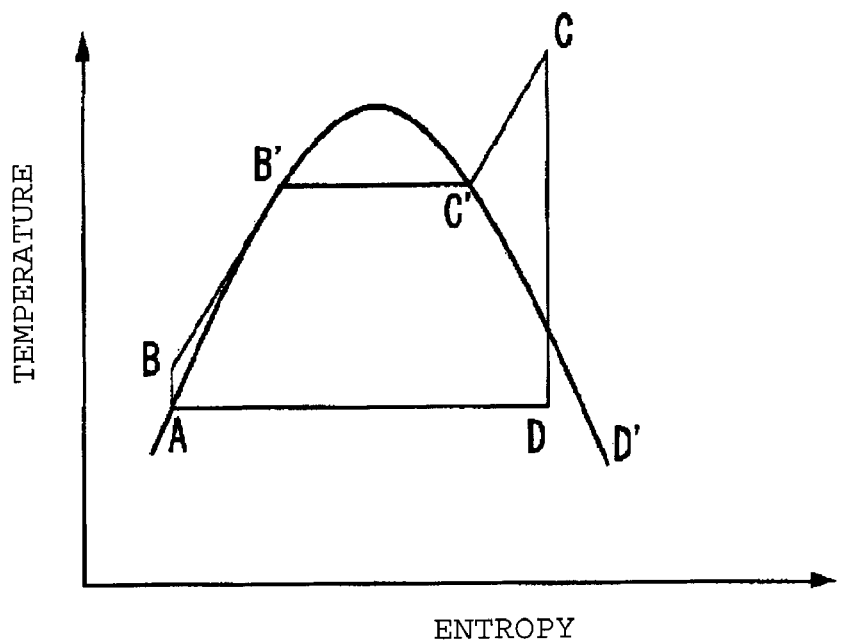
FIG. 2 is a cycle diagram showing the state change of the working medium in the Rankine cycle system on a temperature-entropy chart.

The Rankine cycle system 10 is a cycle comprising an adiabatic change and an isobaric change, and the state change of the working medium may be shown as in FIG. 2, when it is represented on a temperature-entropy chart.

In FIG. 2, the AB'C'D' curve is a saturation line. The AB process is a process wherein adiabatic compression is carried out by the pump 14 to change the working medium A to a high pressure working medium B. The BB'C'C process is a process wherein isobaric heating is carried out in the evaporator 15 to change the high pressure working medium B to the high temperature/high pressure working medium vapor C. The CD process is a process wherein adiabatic expansion is carried out in the expansion device 11 to change the high temperature/high pressure working medium vapor C to the low temperature/low pressure working medium vapor D to generate the work. The DA process is a process wherein isobaric cooling is carried out in the condenser 13 to return the low temperature/low pressure working medium vapor D to the working medium A.

Figure 3:
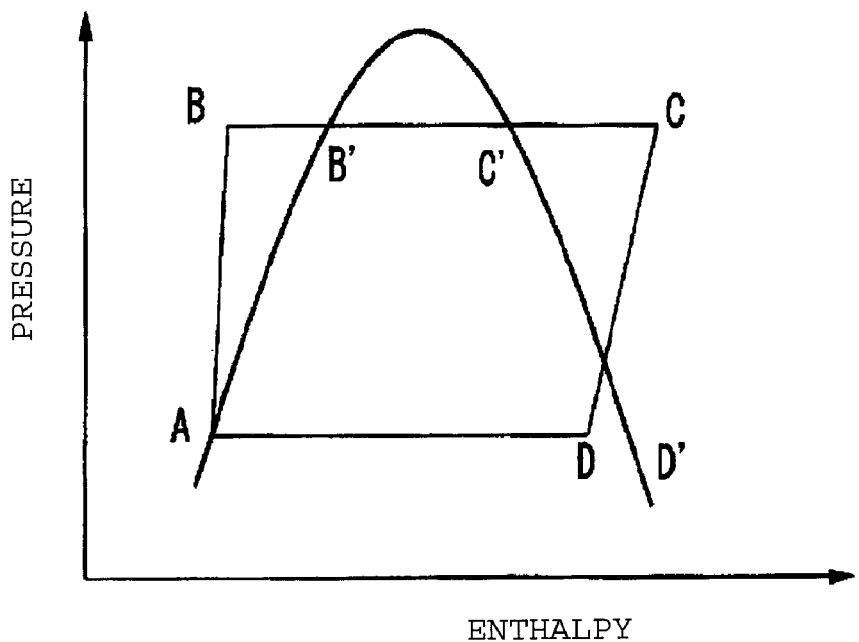
FIG. 3 is a cycle diagram showing the state change of the working medium in the Rankine cycle system on a pressure-enthalpy chart.

In the same manner, the state change of the working medium may be shown as in FIG. 3, when it is represented on a pressure-enthalpy chart.

Heat Pump Cycle System

The heat pump cycle system is a system wherein the heat energy of a working medium is given to a load fluid in a condenser to heat the load fluid thereby to raise the temperature to a higher level.

Figure 4:
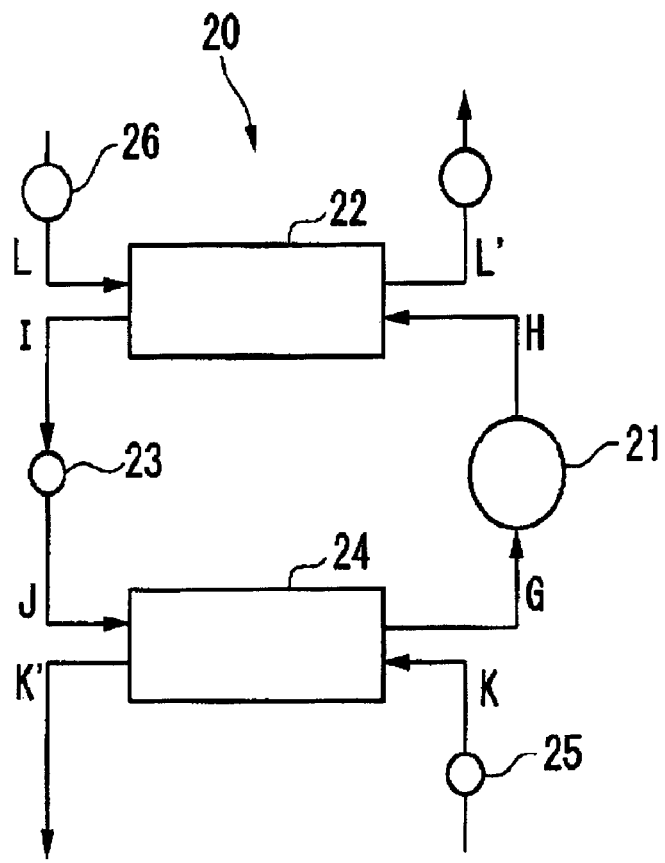
FIG. 4 is a schematic construction view illustrating an example of the heat pump cycle system of the present invention.

FIG. 4 is a schematic construction view illustrating an example of the heat pump cycle system of the present invention. The heat pump cycle system 20 is a system generally comprising a compressor 21 to compress a working medium vapor G to form a high temperature/high pressure working medium vapor H, a condenser 22 to cool and liquefy the working medium vapor H discharged from the compressor 21 to form a low temperature/high pressure working medium I, an expansion valve 23 to let the working medium I discharged from the condenser 22 expand to form a low temperature/low pressure working medium J, an evaporator 24 to heat the working medium J discharged from the expansion valve 23 to form a high temperature/low pressure working medium vapor G, a pump 25 to supply a heat source fluid K to the evaporator 24, and a pump 26 to supply a load fluid L to the condenser 22.

In the heat pump cyclic system, the following cycle is repeated.

(i) A working medium vapor G discharged from an evaporator 24 is compressed by a compressor 21 to form a high temperature/high pressure working medium vapor H.

(ii) The working medium vapor H discharged from the compressor 21 is cooled and liquefied by a load fluid L in a condenser 22 to form a low temperature/high pressure working medium I. At that time, the load fluid L is heated to form a fluid L', which is discharged from the condenser 22.

(iii) The working medium I discharged from the condenser 22 is expanded in the expansion valve 23 to form a low temperature/low pressure working medium J.

(iv) The working medium J discharged from the expansion valve 23 is heated by a heat source fluid K in an evaporator 24 to form a high temperature/low pressure working medium vapor G. At that time, the heat source fluid K is cooled and becomes a fluid K', which is discharged from an evaporator 24.

Figure 5:
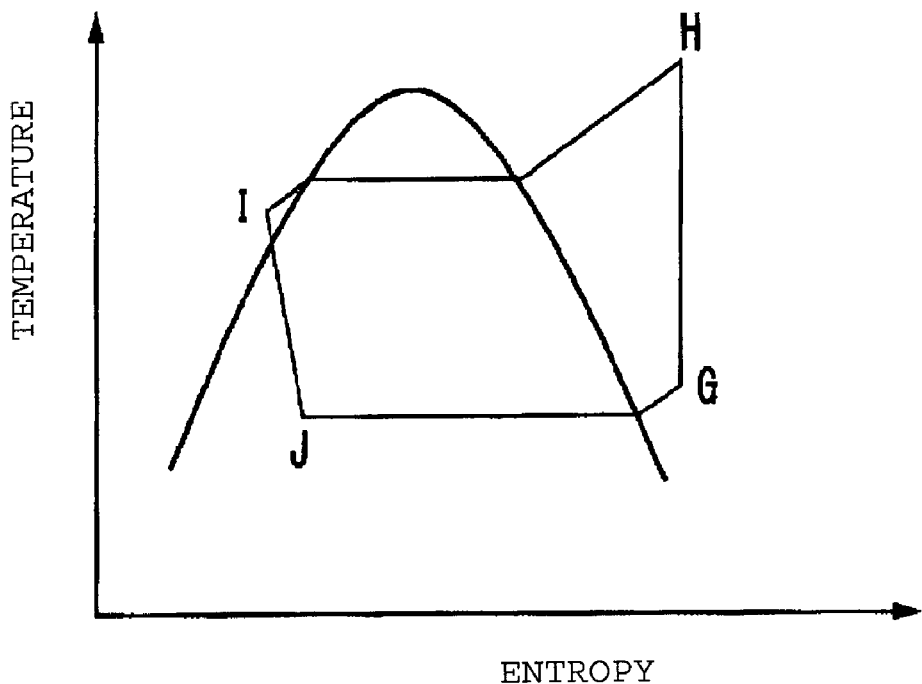
FIG. 5 is a cycle diagram showing the state change of the working medium in the heat pump cycle system on a temperature-entropy chart.

The heat pump cycle system 20 is a cycle comprising an adiabatic isentropic change, an isenthalpic change and an isobaric change, and the state change of the working medium may be shown as in FIG. 5, when it is represented on a temperature-entropy chart.

In FIG. 5, the GH process is a process wherein adiabatic compression is carried out by the compressor 21 to change the high temperature/low pressure working medium vapor G to a high temperature/high pressure working medium vapor H. The HI process is a process wherein isobaric cooling is carried out in a condenser 22 to change the high temperature/high pressure working medium vapor H to a low temperature/high pressure working medium I. The IJ process is a process wherein isenthalpic expansion is carried out by the expansion valve 23 to change the low temperature/high pressure working medium I to a low temperature/low pressure working medium J. The JG process is a process wherein isobaric heating is carried out in the evaporator 24 to have the low temperature/low pressure working medium J returned to a high temperature/low pressure working medium vapor G.

Figure 6:
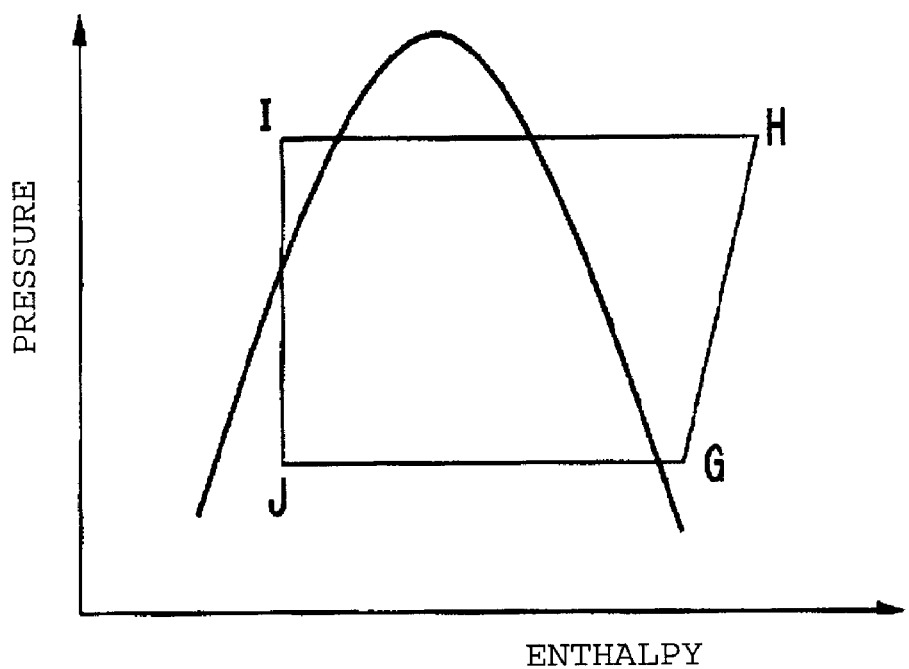
FIG. 6 is a cycle diagram showing the state change of the working medium in the heat pump cycle system on a pressure-enthalpy chart.

In the same manner, the state change of the working medium may be shown as in FIG. 6, when it is represented on a pressure-enthalpy chart.

Refrigerating Cycle System

The refrigerating cycle system is a system wherein in an evaporator, a working medium removes heat energy from a load fluid to cool the load fluid thereby to accomplish cooling to a lower temperature.

As such a refrigerating cycle system, a system similar to the heat pump cycle system 20 in FIG. 4 may, for example, be mentioned.

The working medium as described above has excellent thermodynamic properties (heat cycle characteristics), and when it is used for e.g. a Rankine cycle system, a heat pump cycle system or a refrigerating cycle system, excellent cycle performance (capacity and efficiency) can be obtained. Further, since the efficiency is excellent, it is possible to reduce the power consumption, and since the capacity is excellent, the system can be small-sized.

EXAMPLES

Now, the present invention will be described in further detail with reference to Examples. However, it should be understood that the present invention is by no means restricted thereto.

Examples 1, 2, 4, 6, 7, 9, 11, 12 and 14 are Working Examples of the present invention, and Examples 3, 5, 8, 10, 13 and 15 are Comparative Examples.

Example 1

The power generation capacity and the Rankine cycle efficiency were evaluated with respect to a case where $F(CF_2)_4$—$(CH_2)_2H$ as compound (1-1) was applied to the Rankine cycle system 10 in FIG. 1.

The evaluation was carried out by setting the condensation temperature of the working medium in the condenser 13 to be 25° C. and changing the maximum temperature of the working medium in the expansion device from 60 to 160° C.

In FIG. 1, water was used as fluid E, and water was used also as fluid F.

Further, it was assumed that there was no pressure loss in equipment efficiency and in pipelines or heat exchanger.

The enthalpy h in states A to D was calculated based on the following critical constant, vapor pressure equation, saturated liquid density equation, Starling-Han BWR state equation, specific heat at constant pressure in ideal gas state and various thermodynamic relational expressions, stipulated on the basis of information of measured values.

Here, the coefficients in the critical constant, vapor pressure equation and saturated liquid density correlating equation, were determined by a least squares method on the basis of values in literatures and measured values. The coefficients in the Starling-Han BWR state equation required to calculate the state quantity in a gas phase region, were calculated by using a coefficient correlating equation generalized by Starling-Han and using the critical constant and an acentric factor calculated by a vapor pressure correlating equation. The specific heat at constant pressure in ideal gas state was calculated based on a physical property estimation technique.

Molecular weight of compound (1-1): 248.09
Critical Constant:
 Critical temperature ($T_c$): 478.03 K,
 Critical pressure ($P_c$): 2.227 MPa,
 Critical density ($\rho_c$): 506.8 kg/m³.
Vapor Pressure Equation:

$$\ln \frac{p_s}{p_c} = \frac{T_c}{T}\{a_1\tau + a_2\tau^{1.3} + a_3\tau^3 + a_4\tau^6\}$$

$$\tau = 1 - \frac{T}{T_c}$$

Here, $p_s$ represents the saturated vapor pressure (MPa), T the temperature (K), $a_1$=−8.1672, $a_2$=1.8660, $a_3$=−5.9750, and $a_4$=2.4983.
Saturated Liquid Density Equation:

$$\frac{\rho'}{\rho_c} = 1 + b_1\tau^{1/3} + b_2\tau^{2/3} + b_3\tau + b_4\tau^{4/3}$$

$$\tau = 1 - \frac{T}{T_c}$$

Here, $\rho'$ represents the saturated liquid density (kg/m³), $b_1$=2.1325, $b_2$=−0.33499, $b_3$=1.1570, and $b_4$=−0.011679.
Starling-Han BWR State Equation:

$$p = RT\rho + (B_0RT - A_0 - C_0/T^2 + D_0/T^3 - E_0/T^4)\rho^2 +$$
$$(bRT - a - d/T)\rho^3 + \alpha(a + d/T)\rho^6 + (c/T^2)\rho^2(1 + \gamma\rho^2)\exp(-\gamma\rho^2)$$

Here, p represents the pressure (kPa), $\rho$ the density (kg/m³), $B_0$=9.7311×10⁻⁴, $A_0$=2.8117×10⁻², $C_0$=7.8668×10³, $D_0$=3.7186×10⁵, $E_0$=7.5742×10⁶, b=2.6410×10⁻⁶, a=5.0357×10⁻⁵, c=1.5267×10, d=8.1109×⁻³, $\alpha$=3.9527×10⁻¹⁰, $\gamma$=1.6693×10⁻⁶, and R=3.3514×10⁻² kJ/(kg·K).
Specific Heat at Constant Pressure in Ideal Gas State:

$$C_p^* = c_0 + c_1T + c_2T^2 + c_3T^3$$

Here, $C_p^*$ is the specific heat at constant pressure in ideal gas state (kJ/(kg·K)), t the temperature (K), $C_0$=0.18396, $C_1$=4.7692×10⁻³, $C_2$=−4.5846×10⁻⁶, and $C_3$=1.6051×10⁻⁹.
Various Thermodynamic Relational Expressions:

$$p = f(v, T)$$

$$h(v, T) = T^2 \int_0^v \left[\frac{\partial(p/T)}{\partial T}\right]_v dv + \int_{T_0}^T C_p^* dT - R(T - T_0) + pv + h_1$$

$$s(v, T) = \int_0^v \left(\frac{\partial p}{\partial T}\right)_v dv + \int_{T_0}^T \frac{C_p^*}{T} dT - R\ln\frac{T}{T_0} + s_1$$

$$C_p = T\int_0^v \left(\frac{\partial^2 p}{\partial T^2}\right)_v dv - T\left(\frac{\partial p}{\partial T}\right)_v^2 / \left(\frac{\partial p}{\partial v}\right)_T + C_p^* - R$$

$$C_v = T\int_0^v \left(\frac{\partial^2 p}{\partial T^2}\right)_v dv + C_p^* - R$$

$$a = v\sqrt{-\frac{C_p}{C_v}\left(\frac{\partial P}{\partial V}\right)_T}$$

$$\Delta h_{vp} = T(v'' - v')\frac{dp_s}{dT}$$

$$h' = h'' - \Delta h_{vp}$$

$$s' = s'' - \frac{\Delta h_{vp}}{T}$$

Here, v is the specific volume (m³/kg), h the enthalpy (kJ/kg), $T_0$ the standard temperature (K), $h_1$ a constant (kJ/kg), s the entropy (kJ/(kg·K)), $s_1$ a constant (kJ/(kg·K)), $C_p$ the specific heat at constant pressure (kJ/(kg·K)), $C_v$ the specific heat at constant volume (kJ/(kg·K)), $\Delta h_{vp}$ the latent heat of vaporization (kJ/kg), v' the saturated liquid specific volume (m³/kg), v" the saturated vapor specific volume (m³/kg), h' the saturated liquid enthalpy (kJ/kg), h" the saturated vapor enthalpy (kJ/kg), s' the saturated liquid entropy (kJ/(kg·K)), and s" the saturated vapor entropy (kJ/(kg·K)).

The state quantities in the condenser and the evaporator were obtained as follows.

Upon specifying the temperature, the vapor pressure at that temperature was calculated by using the vapor pressure equation. Then, the density of the saturated liquid at that temperature was calculated by using the saturated liquid density equation. Further, with respect to the density of the saturated vapor, by applying the temperature and the previously determined vapor pressure to the state equation, a satisfying vapor density was calculated by means of a technique of e.g. a Newton Raphson method. Then, using the obtained temperature, vapor pressure and vapor density, the enthalpy and the entropy were calculated by using the thermodynamic relation equation, state equation, or the equation for specific heat at constant pressure in ideal gas state.

The enthalpy and entropy of the saturated liquid were calculated by using the Clausius Clapayron equation as one of thermodynamic relational expressions and using the enthalpy and entropy of the saturated vapor, the saturated liquid density, the saturated vapor density and the temperature dependent value of the vapor pressure (which is obtainable as a differential coefficient of the vapor pressure equation).

The state quantity at the inlet or outlet of the pump 14 or the expansion device 11 was obtained as follows.

By setting the operation pressure and temperature, the density was calculated by trial and error by using the state equation, and then, the enthalpy and the entropy were calculated by the above-described method (the specific heat value in ideal gas state and the value obtainable by applying the state equation to the various thermodynamic relational expressions).

Then, using the enthalpy h in each state (provided that a suffix attached to h indicates the state of the working medium), the power generation capacity L is obtained by the following formula (I), and the Rankine cycle efficiency η was obtained by the following formula (II).

$$L = h_C - h_D \tag{I}$$

$$\eta = \text{effective work/received heat quantity}$$
$$= (\text{power generation capacity - pump work})/\text{received heat quantity}$$
$$= \{(h_C - h_D) - (h_B - h_A)\}/(h_C - h_B)$$

Here, the pump work is extremely small as compared with other items and may be ignored, and then, the Rankine cycle efficiency will be as follows.

$$\eta = \{(h_C - h_D) - (h_B - h_A)\}/\{(h_C - h_A) - (h_B - h_A)\} \approx (h_C - h_D)/(h_C - h_A) \tag{II}$$

Example 2

The power generation capacity and the Rankine cycle efficiency were evaluated in the same manner as in Example 1 except that instead of compound (1-1), $F(CF_2)_6$—H as compound (1-2) was used.

Molecular weight of compound (1-2): 320.05
Critical Constant:
  Critical temperature ($T_C$): 471.37 K
  Critical pressure ($P_C$): 1.949 MPa
  Critical density ($\rho_C$): 587.8 kg/m$^3$.
Vapor Pressure Equation:
  The same as the above vapor pressure equation, provided that $a_1=-8.4481$, $a_2=1.7178$, $a_3=-5.8702$, and $a_4=0.65866$.
Saturated Liquid Density Equation:
  The same as the above saturated liquid density equation, provided that $b_1=2.3951$, $b_2=-1.0695$, $b_3=2.1805$, and $b_4=-0.44604$.
Starling-Han BWR State Equation:
  The same as the above Starling-Han BWR state equation, provided that $B_0=8.5213\times10^{-4}$, $A_0=1.7257\times10^{-2}$, $C_0=5.5670\times10^3$, $D_0=2.6101\times10^5$, $E_0=4.9163\times10^6$, $b=2.0308\times10^{-6}$, $a=3.0394\times10^{-5}$, $c=9.1282$, $d=5.0598\times10^{-3}$, $\alpha=2.3886\times10^{-10}$, $\gamma=1.1890\times10^{-6}$, and $R=2.5979\times10^{-2}$ kJ/(kg·K).

Specific Heat at Constant Pressure in Ideal Gas State:
  The same as the above formula of specific heat at constant pressure in ideal gas state, provided that $C_0=-0.14819$, $C_1=4.2559\times10^{-3}$, $C_2=-4.3055\times10^{-6}$, and $C_3=1.5372\times10^{-9}$.

Example 3

The power generation capacity and the Rankine cycle efficiency were evaluated in the same manner as in Example 1 except that instead of compound (1-1), linear compound (2-1) was used.

$$n\text{-}C_6F_{14} \tag{2-1}$$

Molecular weight of compound (2-1): 338.04
Critical Constant:
  Critical temperature ($T_C$): 448.8 K
  Critical pressure ($P_C$): 1.87 MPa
  Critical density ($\rho_C$): 557.8 kg/m$^3$.
Vapor Pressure Equation:
  The same as the above vapor pressure equation, provided that $a_1=-9.2675$, $a_2=3.2893$, $a_3=-7.7846$, and $a_4=2.4093$.
Saturated Liquid Density Equation:
  The same as the above saturated liquid density equation, provided that $b_1=3.3190$, $b_2=-2.5942$, $b_3=2.9461$, and $b_4=-0.20816$.
Starling-Han BWR State Equation:
  The same as the above Starling-Han BWR state equation, provided that $B_0=9.0283\times10^{-4}$, $A_0=1.5962\times10^{-2}$, $C_0=4.9546\times10^3$, $D_0=2.2157\times10^5$, $E_0=3.8944\times10^5$, $b=2.2815\times10^{-6}$, $a=3.1055\times10^{-5}$, $c=8.5061$, $d=4.9965\times10^{-3}$, $\alpha=2.7345\times10^{-10}$, $\gamma=1.2998\times10^{-6}$, and $R=2.4596\times10^{-2}$ kJ/(kg·K).

Specific Heat at Constant Pressure in Ideal Gas State:
  The same as the above formula of specific heat at constant pressure in ideal gas state, provided that $C_0=-0.18971$, $C_1=4.4190\times10^{-3}$, $C_2=-4.6237\times10^{-6}$, and $C_3=1.6862\times10^{-9}$.

Figure 7:
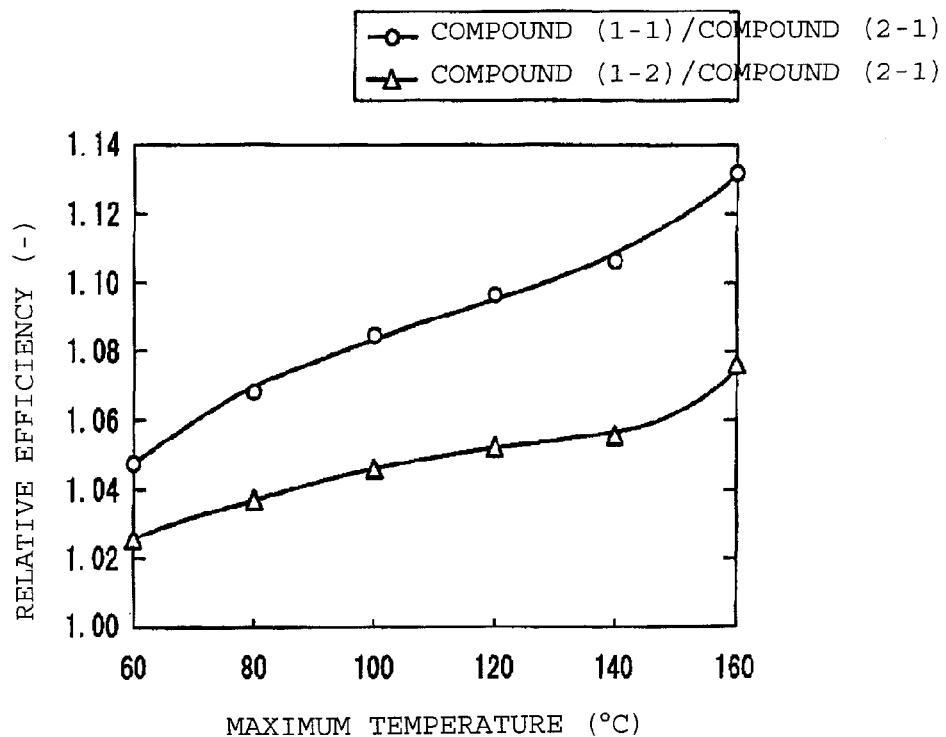
FIG. 7 is a graph showing the relative efficiency of the Rankine cycle efficiency of compound (1-1) or (1-2) to the Rankine cycle efficiency of compound (2-1), at each maximum temperature.

FIG. 7 shows the relative efficiency of the Rankine cycle efficiency of compound (1-1) or compound (1-2) to the Rankine cycle efficiency of compound (2-1) (compound (1-1)/compound (2-1), or compound (1-2)/compound (2-1)) at each maximum temperature.

Figure 8:
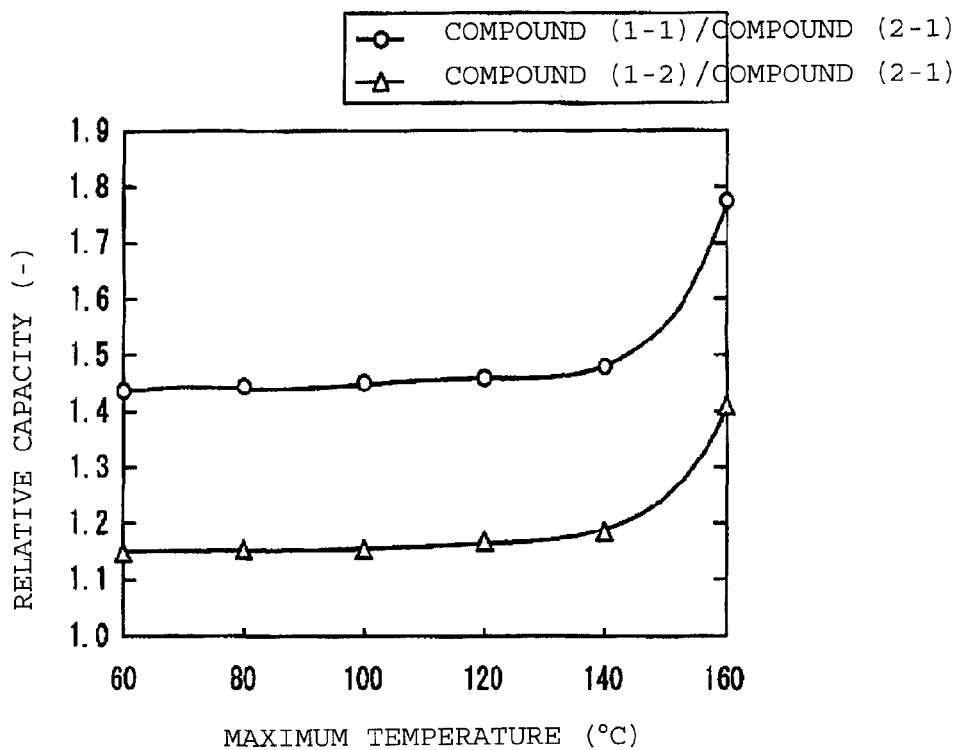
FIG. 8 is a graph showing the relative capacity of the power generation capacity of compound (1-1) or compound (1-2) to the power generation capacity of compound (2-1), at each maximum temperature.

FIG. 8 shows the relative capacity of the power generation capacity of compound (1-1) or compound (1-2) to the power generation capacity of compound (2-1) (compound (1-1)/compound (2-1), or compound (1-2)/compound (2-1)) at each maximum temperature.

From the results in FIGS. 7 and 8, it is evident that compound (1-1) and compound (1-2) have the Rankine cycle performance substantially improved over compound (2-1).

Example 4

The power generation capacity and the Rankine cycle efficiency were evaluated in the same manner as in Example 1 except that instead of compound (1-1), $F(CF_2)_6$—$CH_2)_2H$ as compound (1-3) was used.

Molecular weight of compound (1-3): 348.11
Critical Constant:
  Critical temperature ($T_C$): 518.56 K
  Critical pressure ($P_C$): 1.809 MPa
  Critical density ($\rho_C$): 534.3 kg/m$^3$.
Vapor Pressure Equation:
  The same as the above vapor pressure equation, provided that $a_1=-7.7835$, $a_2=-1.5811$, $a_3=0.51001$, and $a_4=-9.9295$.

Saturated Liquid Density Equation:
  The same as the above saturated liquid density equation, provided that $b_1=2.4173$, $b_2=-2.0105$, $b_3=4.5530$, and $b_4=-2.1798$.
Starling-Han BWR State Equation:
  The same as the above Starling-Han BWR state equation, provided that $B_0=9.6132\times10^{-4}$, $A_0=1.6842\times10^{-2}$, $C_0=8.6742\times10^3$, $D_0=4.5079\times10^5$, $E_0=8.5622\times10^6$, $b=2.5930\times10^{-6}$, $a=4.0822\times10^{-5}$, $c=1.5229\times10$, $d=7.9665\times10^{-3}$, $\alpha=2.8581\times10^{-10}$, $\gamma=1.3341\times10^{-6}$, and $R=2.3885\times10^{-2}$ kJ/(kg·K).
Specific Heat at Constant Pressure in Ideal Gas State:
  The same as the above formula of specific heat at constant pressure in ideal gas state, provided that $C_0=-0.20695$, $C_1=4.8031\times10^{-3}$, $C_2=-4.7554\times10^{-6}$, and $C_3=1.6897\times10^{-9}$.

Example 5

The power generation capacity and the Rankine cycle efficiency were evaluated in the same manner as in Example 1 except that instead of compound (1-1), linear compound (2-2) was used.

$$n\text{-}C_8F_{18} \qquad (2\text{-}2)$$

Molecular weight of compound (2-2): 438.06
Critical Constant:
  Critical temperature ($T_C$): 497.51 K
  Critical pressure ($P_C$): 1.475 MPa
  Critical density ($\rho_C$): 643 kg/m$^3$.
Vapor Pressure Equation:
  The same as the above vapor pressure equation, provided that $a_1=-10.252$, $a_2=5.5762$, $a_3=-13.148$, and $a_4=17.720$.
Saturated Liquid Density Equation:
  The same as the above saturated liquid density equation, provided that $b_1=0.92218$, $b_2=4.6769$, $b_3=-7.0741$, and $b_4=4.6414$.
Starling-Han BWR State Equation:
  The same as the above Starling-Han BWR state equation, provided that $B_0=7.8913\times10^{-4}$, $A_0=1.1399\times10^{-2}$, $C_0=4.7232\times10^3$, $D_0=2.3470\times10^5$, $E_0=4.4530\times10^6$, $b=1.7448\times10^{-6}$, $a=2.0561\times10^{-5}$, $c=6.9758$, $d=3.7395\times10^{-3}$, $\alpha=1.7300\times10^{-10}$, $\gamma=9.5650\times10^{-7}$, and $R=1.8980\times10^{-2}$ kJ/(kg·K).
Specific Heat at Constant Pressure in Ideal Gas State:
  The same as the above formula of specific heat at constant pressure in ideal gas state, provided that $C_0=-0.20666$, $C_1=4.5259\times10^{-3}$, $C_2=-4.7505\times10^{-6}$, and $C_3=1.7349\times10^{-9}$.

Figure 9:
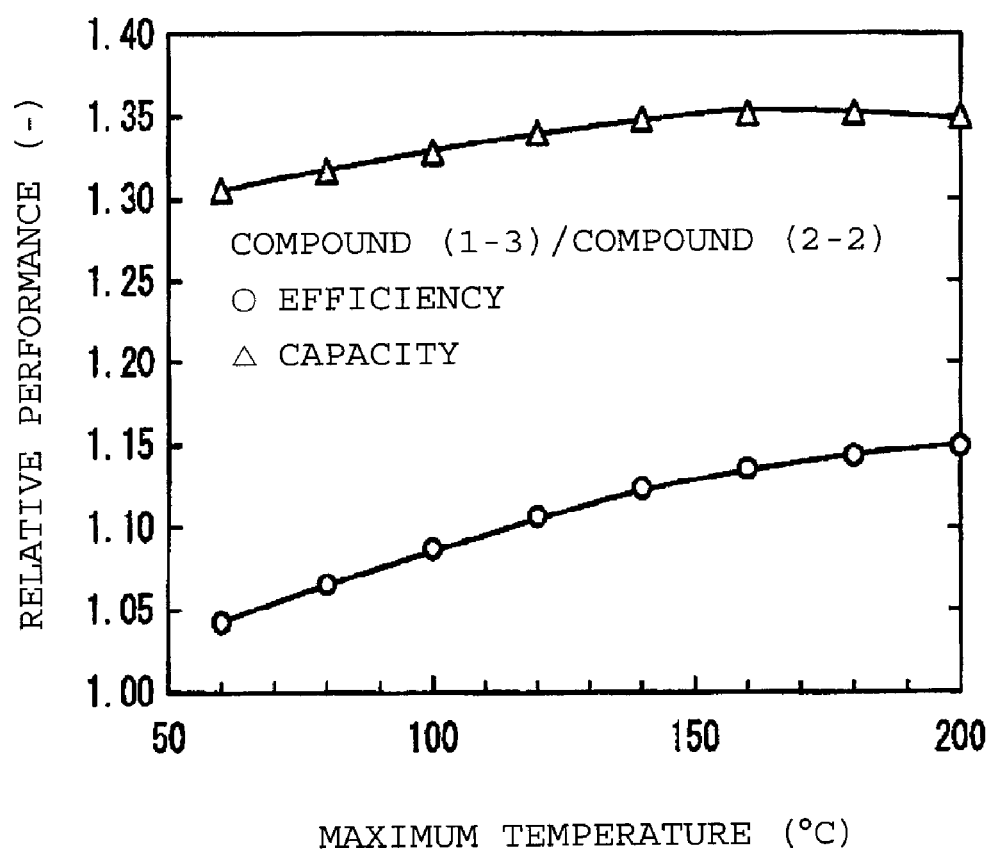
FIG. 9 is a graph showing the relative efficiency of the Rankine cycle efficiency of compound (1-3) to the Rankine cycle efficiency of compound (2-2), and the relative capacity of the power generation capacity of compound (1-3) to the power generation capacity of compound (2-2), at each maximum temperature.

FIG. 9 shows the relative efficiency of the Rankine cycle efficiency of compound (1-3) to the Rankine cycle efficiency of compound (2-2) (compound (1-3)/compound (2-2)) at each maximum temperature.

FIG. 9 shows the relative capacity of the power generation capacity of compound (1-3) to the power generation capacity of compound (2-2) (compound (1-3)/compound (2-2)) at each maximum temperature.

From the results in FIG. 9, it is evident that compound (1-3) has the Rankine cycle performance substantially improved over compound (2-2).

From the foregoing, it is evident that the working medium of the present invention is effective as a working medium in a Rankine cycle system.

Example 6

The heat pump capacity and the heat pump cycle efficiency were evaluated in a case where $F(CF_2)_4$—$(CH_2)_2H$ as compound (1-1) was applied to the heat pump cycle system in FIG. 4.

Here, in FIG. 4, water was used as fluid K, and water was used also as fluid L.

Evaluation was carried out by adjusting the evaporation temperature of the working medium in the evaporator 24 to be 50° C., and the condensing temperature of the working medium in the condenser 22 to be 100° C., and by adjusting the supercooling degree of the working medium in the condenser 22 to be 15° C. Further, it was carried out by adjusting the evaporation temperature of the working medium in the evaporator 24 to be 70° C., and the condensing temperature of the working medium in the condenser 22 to be 120° C., and adjusting the supercooling degree of the working medium in the condenser to be 15° C.

Further, it was assumed that there was no pressure loss in the instrumental efficiency and in the pipelines or heat exchanger.

The enthalpy h in states G to I was obtained in the same manner as in Example 1.

Then, using the enthalpy h in each state (provided that a suffix attached to h indicates the state of the working medium), the heat pump capacity Q was obtained by the following formula (III), and the heat pump cycle efficiency η was obtained by the following formula (IV).

$$Q = h_H - h_I \qquad (III)$$

$$\eta = \text{heat pump capacity/compression work} \qquad (IV)$$
$$= (h_H - h_I)/(h_H - h_G)$$

Example 7

The heat pump capacity and the heat pump cycle efficiency were evaluated in the same manner as in Example 6 except that instead of compound (1-1), $F(CF_2)_6$—H as compound (1-2) was used.

Example 8

The heat pump capacity and the heat pump cycle efficiency were evaluated in the same manner as in example 6 except that instead of compound (1-1), linear compound (2-1) was used.

Table 1 shows the relative efficiency of the heat pump cycle efficiency of compound (1-1) or compound (1-2) to the heat pump cycle efficiency of compound (2-1) (compound (1-1)/compound (2-1), or compound (1-2)/compound (2-1)) at an evaporation temperature of 50° C. and a condensation temperature of 100° C.

Table 1 shows the relative capacity of the heat pump capacity of compound (1-1) or compound (1-2) to the heat pump capacity of compound (2-1) (compound (1-1)/compound (2-1), or compound (1-2)/compound (2-1)) at an evaporation temperature of 50° C. and a condensation temperature of 100° C.

Table 2 shows the relative efficiency of the heat pump cycle efficiency of compound (1-1) or compound (1-2) to the heat pump cycle efficiency of compound (2-1) (compound (1-1)/compound (2-1), or compound (1-2)/compound (2-1)) at an evaporation temperature of 70° C. and a condensation temperature of 120° C.

Table 2 shows the relative capacity of the heat pump capacity of compound (1-1) or compound (1-2) to the heat pump capacity of compound (2-1) (compound (1-1)/compound (2-1), or compound (1-2)/compound (2-1)) at an evaporation temperature of 70° C. and a condensation temperature of 120° C.

TABLE 1

| | | Evaporation temperature (° C.) | Condensation temperature (° C.) | Relative efficiency (—) | Relative capacity (—) |
|---|---|---|---|---|---|
| Ex. 6 | Compound (1-1) | 50 | 100 | 1.00 | 1.48 |
| Ex. 7 | Compound (1-2) | 50 | 100 | 1.01 | 1.19 |
| Ex. 7 | Compound (2-1) | 50 | 100 | 1.00 | 1.00 |

TABLE 2

| | | Evaporation temperature (° C.) | Condensation temperature (° C.) | Relative efficiency (—) | Relative capacity (—) |
|---|---|---|---|---|---|
| Ex. 6 | Compound (1-1) | 70 | 120 | 1.02 | 1.53 |
| Ex. 7 | Compound (1-2) | 70 | 120 | 1.03 | 1.23 |
| Ex. 8 | Compound (2-1) | 70 | 120 | 1.00 | 1.00 |

From the results of Tables 1 and 2, it is evident that compound (1-1) and compound (1-2) have the heat pump cycle performance substantially improved over compound (2-1).

Example 9

The heat pump capacity and the heat pump cycle efficiency were evaluated in the same manner as in Example 6 except that instead of compound (1-1), $F(CF_2)_6$—$(CH_2)_2H$ as compound (1-3) was used.

Example 10

The heat pump capacity and the heat pump cycle efficiency were evaluated in the same manner as in Example 6 except that instead of compound (1-1), linear compound (2-2) was used.

Table 3 shows the relative efficiency of the heat pump cycle efficiency of compound (1-3) to the heat pump cycle efficiency of compound (2-2) (compound (1-3)/compound (2-2)) at each evaporation temperature and condensation temperature.

Table 3 shows the relative capacity of the heat pump capacity of compound (1-3) to the heat pump capacity of compound (2-2) (compound (1-3)/compound (2-2)) at each evaporation temperature and condensation temperature.

TABLE 3

| | | Evaporation temperature (° C.) | Condensation temperature (° C.) | Relative efficiency (—) | Relative capacity (—) |
|---|---|---|---|---|---|
| Ex. 9 | Compound (1-3) | 50 | 100 | 1.00 | 1.35 |
| | | 70 | 120 | 1.00 | 1.39 |
| Ex. 10 | Compound (2-2) | 50 | 100 | 1.00 | 1.00 |
| | | 70 | 120 | 1.00 | 1.00 |

From the results in Table 3, it is evident that compound (1-3) has the heat pump cycle performance substantially improved over compound (2-2).

From the foregoing, it is evident that the working medium of the present invention is effective as a working medium in a heat pump cycle system.

Example 11

The refrigerating capacity and the refrigerating cycle efficiency were evaluated in a case where $F(CF_2)_4$—$(CH_2)_2H$ as compound (1-1) was applied to a refrigerating cycle system.

Evaluation was carried out by setting the evaporation temperature of the working medium in the evaporator to be 25° C. and the condensing temperature of the working medium in the condenser to be 80° C., and adjusting the supercooling degree of the cooling medium in the condenser to be 15° C.

Further, it was assumed that there was no pressure loss in the equipment efficiency and in the pipelines and heat exchanger.

The enthalpy h in states G, H and J was obtained in the same manner as in Example 1.

Then, using the enthalpy h in each state (provided that a suffix attached to h indicates the state of the working medium in FIG. 4), the refrigerating capacity Q was obtained by the following formula (V), and the refrigerating cycle efficiency η was obtained by the following formula (VI).

$$Q = h_G - h_J \quad (V)$$

$$\eta = \text{refrigerating capacity/compression work} \quad (VI)$$
$$= (h_G - h_J)/(h_H - h_G)$$

Example 12

The refrigerating capacity and the refrigerating cycle efficiency were evaluated in the same manner as in Example 11 except that instead of compound (1-1), $F(CF_2)_6$—H as compound (1-2) was used.

Example 13

The refrigerating capacity and the refrigerating cycle efficiency were evaluated in the same manner as in Example 11 except that instead of compound (1-1), linear compound (2-1) was used.

Table 4 shows the relative efficiency of the refrigerating cycle efficiency of compound (1-1) or compound (1-2) to the refrigerating cycle efficiency of compound (2-1) (compound (1-1)/compound (2-1), or compound (1-2)/compound (2-1)) at an evaporation temperature of 25° C. and a condensation temperature of 80° C.

Table 4 shows the relative capacity of the refrigerating capacity of compound (1-1) or compound (1-2) to the refrigerating capacity of compound (2-1) (compound (1-1)/compound (2-1), or compound (1-2)/compound (2-1)) at an evaporation temperature of 25° C. and at a condensation temperature of 80° C.

TABLE 24

| | | Evaporation temperature (° C.) | Condensation temperature (° C.) | Relative efficiency (—) | Relative capacity (—) |
|---|---|---|---|---|---|
| Ex. 11 | Compound (1-1) | 25 | 80 | 1.05 | 1.53 |

TABLE 24-continued

| | | Evaporation temperature (° C.) | Condensation temperature (° C.) | Relative efficiency (—) | Relative capacity (—) |
|---|---|---|---|---|---|
| Ex. 12 | Compound (1-2) | 25 | 80 | 1.05 | 1.21 |
| Ex. 13 | Compound (2-1) | 25 | 80 | 1.00 | 1.00 |

From the results in Table 4, it is evident that compound (1-1) and compound (1-2) have the refrigerating cycle performance substantially improved over compound (2-1).

Example 14

The refrigerating capacity and the refrigerating cycle efficiency were evaluated in the same manner as in Example 11 except that instead of compound (1-1), $F(CF_2)_6—(CH_2)_2H$ as compound (1-3) was used.

Example 15

The refrigerating capacity and the refrigerating cycle efficiency were evaluated in the same manner as in Example 11 except that instead of compound (1-1), linear compound (2-2) was used.

Table 5 shows the relative efficiency of the refrigerating cycle efficiency of compound (1-3) to the refrigerating cycle efficiency of compound (2-2) (compound (1-3)/compound (2-2)) at an evaporation temperature of 25° C. and at a condensation temperature of 80° C.

Table 5 shows the relative capacity of the refrigerating capacity of compound (1-3) to the refrigerating capacity of compound (2-2) (compound (1-3)/compound (2-2)) at an evaporation temperature of 25° C. and at a condensation temperature of 80° C.

TABLE 5

| | | Evaporation temperature (° C.) | Condensation temperature (° C.) | Relative efficiency (—) | Relative capacity (—) |
|---|---|---|---|---|---|
| Ex. 14 | Compound (1-3) | 25 | 80 | 1.39 | 1.06 |
| Ex. 15 | Compound (2-2) | 25 | 80 | 1.00 | 1.00 |

From the results in Table 5, it is evident that compound (1-3) has the refrigerating cycle performance substantially improved over compound (2-2).

From the foregoing, it is evident that the working medium of the present invention is effective as a working medium in a refrigerating cycle system.

INDUSTRIAL APPLICABILITY

The working medium for heat cycle of the present invention is non-flammable, less influential over the environment and excellent in heat cycle characteristics and thus is useful as a working medium for a Rankine cycle system, a heat pump cycle system and a refrigerating cycle system. It is particularly useful for a Rankine cycle system which is intended to recover heat from geothermal energy, solar energy or a waste heat in a medium-to-high temperature region at a level of from 50 to 200° C., and for a heat pump cycle system which is intended to take out a temperature of at least 50° C.

The entire disclosure of Japanese Patent Application No. 2007-044959 filed on Feb. 26, 2007 including specification, claims, drawings and summary is incorporated herein by reference in its entirety.

What is claimed is:

1. A Rankine cycle system employing a working medium for heat cycle-wherein said working medium comprising a compound represented by formula (1-3):

$$C_6F_{13}—C_2H_5 \qquad (1-3).$$

2. A heat pump cycle system employing a working medium for heat cycle wherein said working medium comprising a compound represented by formula (1-3):

$$C_6F_{13}—C_2H_5 \qquad (1-3).$$

3. A refrigerating cycle system employing a working medium for heat cycle wherein said working medium comprising a compound represented by formula (1-3):

$$C_6F_{13}—C_2H_5 \qquad (1-3).$$

4. The Rankine cycle system according to claim 1, wherein the working medium further comprises at least one compound selected from the group consisting of a $C_{1-4}$ alcohol, a chlorocarbon, a hydrochlorofluorocarbon (HCFC), a hydrofluorocarbon (HFC), and a fluoroether.

5. The Rankine cycle system according to claim 4, wherein the at least one compound is present in an amount of at most 30 mass % in the working medium (100 mass %).

6. The heat pump cycle system according to claim 2, wherein the working medium further comprises at least one compound selected from the group consisting of a $C_{1-4}$ alcohol, a chlorocarbon, a hydrochlorofluorocarbon (HCFC), a hydrofluorocarbon (HFC), and a fluoroether.

7. The heat pump cycle system according to claim 6, wherein the at least one compound is present in an amount of at most 30 mass % in the working medium (100 mass %).

8. The refrigerating cycle system according to claim 3, wherein the working medium further comprises at least one compound selected from the group consisting of a $C_{1-4}$ alcohol, a chlorocarbon, a hydrochlorofluorocarbon (HCFC), a hydrofluorocarbon (HFC), and a fluoroether.

9. The refrigerating cycle system according to claim 8, wherein the at least one compound is present in an amount of at most 30 mass % in the working medium (100 mass %).

10. The Rankine cycle system of claim 1, comprising an evaporator and wherein the working medium is in the evaporator.

11. The heat pump cycle system of claim 2, comprising a condenser and wherein the working medium is in the condenser.

12. The refrigerating cycle system of claim 3, comprising an evaporator and wherein the working medium is in the evaporator.

* * * * *